(12) United States Patent
Kim et al.

(10) Patent No.: US 9,123,927 B2
(45) Date of Patent: *Sep. 1, 2015

(54) SECONDARY BATTERY

(75) Inventors: Dukjung Kim, Yongin-si (KR);
Minhyung Guen, Yongin-si (KR)

(73) Assignees: Samsung SDI Co., Ltd., Yongin-si
(KR); Robert Bosch GmbH, Stuttgart
(DE)

( * ) Notice: Subject to any disclaimer, the term of this
patent is extended or adjusted under 35
U.S.C. 154(b) by 956 days.

This patent is subject to a terminal disclaimer.

(21) Appl. No.: 13/187,428

(22) Filed: Jul. 20, 2011

(65) Prior Publication Data

US 2012/0251851 A1 Oct. 4, 2012

(30) Foreign Application Priority Data

Mar. 30, 2011 (KR) .................. 10-2011-0028954

(51) Int. Cl.
*H01M 10/42* (2006.01)
*H01M 2/02* (2006.01)
*H01M 2/04* (2006.01)
*H01M 2/22* (2006.01)
*H01M 2/30* (2006.01)
*H01M 10/04* (2006.01)

(52) U.S. Cl.
CPC .............. *H01M 2/043* (2013.01); *H01M 2/22*
(2013.01); *H01M 2/30* (2013.01); *H01M
10/0431* (2013.01); *H01M 10/42* (2013.01);
*H01M 2/305* (2013.01)

(58) Field of Classification Search
USPC ..................................... 429/61–62
See application file for complete search history.

(56) References Cited

U.S. PATENT DOCUMENTS

| 6,342,826 | B1* | 1/2002 | Quinn et al. .................. 337/300 |
| 2006/0019158 | A1* | 1/2006 | Mori et al. .................... 429/174 |
| 2008/0254343 | A1* | 10/2008 | Kaplin et al. ................... 429/53 |
| 2009/0092163 | A1 | 4/2009 | Hirata et al. |
| 2010/0209765 | A1 | 8/2010 | Bak |
| 2010/0279156 | A1 | 11/2010 | Kim et al. |

(Continued)

FOREIGN PATENT DOCUMENTS

| CN | 101950812 A | 1/2011 |
| EP | 2 284 932 A1 | 2/2011 |
| JP | 10-326610 | * 12/1998 |

(Continued)

OTHER PUBLICATIONS

Extended European Search Report for corresponding European Patent Application No. 11 17 9136.4, dated Mar. 19, 2012, 5pp.

(Continued)

*Primary Examiner* — Ula C Ruddock
*Assistant Examiner* — Osei Amponsah
(74) *Attorney, Agent, or Firm* — Christie, Parker & Hale, LLP (57) ABSTRACT

A secondary battery that can induce an internal short circuit in accordance with a stimulus, for example, excessive internal pressure or temperature, is provided. The secondary battery includes an electrode assembly, a collecting plate electrically connected to the electrode assembly and having a short circuit hole, a short circuit member including a short circuit plate installed in the short circuit hole, a case accommodating the electrode assembly and the collecting plate and having an opening, and a cap assembly including a cap plate sealing the opening of the case. The short circuit plate faces the cap plate.

11 Claims, 9 Drawing Sheets

(56) References Cited

U.S. PATENT DOCUMENTS

| | | |
|---|---|---|
| 2011/0039136 A1 | 2/2011 | Byun et al. |
| 2011/0052949 A1 | 3/2011 | Byun et al. |

FOREIGN PATENT DOCUMENTS

| | | | |
|---|---|---|---|
| JP | 1998-326610 | * | 12/1998 |
| JP | 2000-182598 A | | 6/2000 |
| JP | 2011-040391 A | | 2/2011 |
| KR | 10-2009-0034738 A | | 4/2009 |
| KR | 10-2010-0093375 A | | 8/2010 |
| KR | 2011-0005197 A | | 1/2011 |
| KR | 2011-0025056 A | | 3/2011 |

OTHER PUBLICATIONS

Machine English Translation of JP2000-182598A, Patent Abstracts of Japan, 23 pages.

Notice of Allowance dated Feb. 28, 2013 issued in Korean Patent Application No. KR10-2011-0028954, 5 pages.

SIPO Office action dated Jan. 6, 2014, for corresponding Chinese Patent application 201110267940.3, (13 pages).

* cited by examiner

SECONDARY BATTERY

CROSS-REFERENCE TO RELATED APPLICATION

This application claims priority to and the benefit of Korean Patent Application No. 10-2011-0028954, filed on Mar. 30, 2011 in the Korean Intellectual Property Office, the entire content of which is incorporated herein by reference.

BACKGROUND

1. Field

Aspects of embodiments of the present invention are directed toward a secondary battery.

2. Description of Related Art

Unlike primary batteries, which are not designed to be recharged, secondary batteries can be repeatedly charged and discharged. A low capacity secondary battery that uses a single battery cell packaged in a battery pack is used as a power source for various portable small-sized electronic devices such as cellular phones and camcorders. A high capacity secondary battery that uses tens of battery cells connected to each other in a battery pack is widely used as a power source for driving motors such as in electric scooters or hybrid electric vehicles (HEVs).

Secondary batteries may be classified into different types, for example, cylindrical and prismatic types. A unit battery includes an electrode assembly having positive and negative electrodes and a separator interposed between the positive and negative electrodes, a case for receiving the electrode assembly with an electrolyte, and a cap assembly having an electrode terminal installed in the case.

The secondary battery may catch fire or explode due to an increase in the internal pressure when, for example, excessive heat is generated. This may take place due to, for example, overcharging the battery or when the electrolyte decomposes. Accordingly, there is a need for a secondary battery with improved safety capabilities.

SUMMARY

Aspects of embodiments of the present invention are directed toward a secondary battery with reduced manufacturing costs and number of manufacturing process steps. In addition, aspects of embodiments of the present invention are directed toward reducing the overall weight and volume of the battery by reducing the number of components. This can help prevent short circuits due to external moisture contacting a short circuit member. This can also efficiently utilize an internal space of the battery, which can improve assembling efficiency of the cap assembly. In addition, this can induce a short circuit according to a stimulus, such as excessive pressure or temperature, during overcharging.

In an exemplary embodiment of the present invention, a secondary battery is provided. The secondary battery includes an electrode assembly, a collecting plate electrically connected to the electrode assembly and having a short circuit hole, a short circuit member including a short circuit plate installed in the short circuit hole, a case accommodating the electrode assembly and the collecting plate and having an opening, and a cap assembly including a cap plate sealing the opening of the case. The short circuit plate faces the cap plate.

The short circuit plate may be spaced apart from the cap plate.

The short circuit plate and the cap plate may be made of a conductive material and configured to have different polarities.

The short circuit plate may be configured to contact the cap plate when an internal pressure of the secondary battery exceeds a reference pressure level.

The short circuit plate may be configured to contact the cap plate when an internal temperature of the secondary battery exceeds a reference temperature.

The short circuit plate may be an invertible plate and include a downwardly convex round portion, and an edge portion extending from an edge of the round portion and fixed to a portion of the collecting plate corresponding to a lateral surface of the short circuit hole.

The short circuit member may further include a sealing plate between the cap plate and the collecting plate to correspond to a periphery of the short circuit hole. The sealing plate may have an opening formed at a location corresponding to the short circuit plate.

The sealing plate may be made of an insulating material.

The secondary battery may further include a lower insulation member between the collecting plate and the cap plate and covering the collecting plate. The lower insulation member may have an exposing hole formed at a location corresponding to the short circuit plate.

Top surfaces of the lower insulation member and the sealing plate may be coplanar.

The collecting plate may include a connecting portion between an upper portion of the electrode assembly and a lower portion of the cap assembly and having the short circuit hole, and an extending portion extending substantially perpendicularly from an end of the connecting portion and electrically connected to the electrode assembly.

The connecting portion may further have a fuse hole formed between the short circuit hole and the extending portion.

According to another exemplary embodiment of the present invention, a secondary battery is provided. The secondary battery includes an electrode assembly, a collecting plate electrically connected to the electrode assembly, a case accommodating the electrode assembly and the collecting plate and having an opening, a cap assembly comprising a cap plate sealing the opening of the case, and a short circuit member installed in the collecting plate and facing the cap plate.

The short circuit member may be spaced apart from the cap plate.

The short circuit member may be made of a shape memory alloy configured to change shape from a first shape to a second shape in response to a reference temperature.

The short circuit member may be made of at least one shape memory alloy selected from the group consisting of Ti—Ni, Ni—Al, In—Ti, Ti—Ni—Fe, and combinations thereof.

The short circuit member may be configured to contact the cap plate when an internal pressure of the secondary battery exceeds a reference pressure level.

The short circuit member may be configured to contact the cap plate when an internal temperature of the secondary battery exceeds a reference temperature.

The short circuit member may be an invertible plate and include a downwardly convex round portion and an edge portion extending from an edge of the round portion and fixed to a surface of the collecting plate.

The secondary battery may further include a lower insulation member between the collecting plate and the cap plate and covering the collecting plate. The lower insulation member may have an exposing hole formed at a location corresponding to the short circuit member.

As described above, in a secondary battery according to an embodiment of the present invention, since a short circuit member is installed in the secondary battery, the number of components is reduced, thereby reducing the manufacturing cost and the number of manufacturing process steps while reducing the overall weight and volume of the battery. In addition, the secondary battery can help prevent a short circuit from occurring due to external moisture contacting a short circuit member. Further, the secondary battery can efficiently utilize an internal space of the battery by installing the short circuit member in the secondary battery. Additionally, the secondary battery can improve assembling efficiency of a cap assembly. In addition, the secondary battery can induce a short circuit in accordance with a stimulus, such as excessive pressure or temperature, during, for example, overcharging while using the short circuit member.

Additional aspects and/or features of embodiments of the present invention will be set forth in part in the description that follows and, in part, will be obvious from the description to one of ordinary skill in the art, or may be learned by practice of the invention.

BRIEF DESCRIPTION OF THE DRAWINGS

Aspects and features of the present invention will be more apparent from the following detailed description in conjunction with the accompanying drawings, in which.

DETAILED DESCRIPTION

Hereinafter, embodiments of the present invention will be described in detail with reference to the accompanying drawings.

Figure 1:
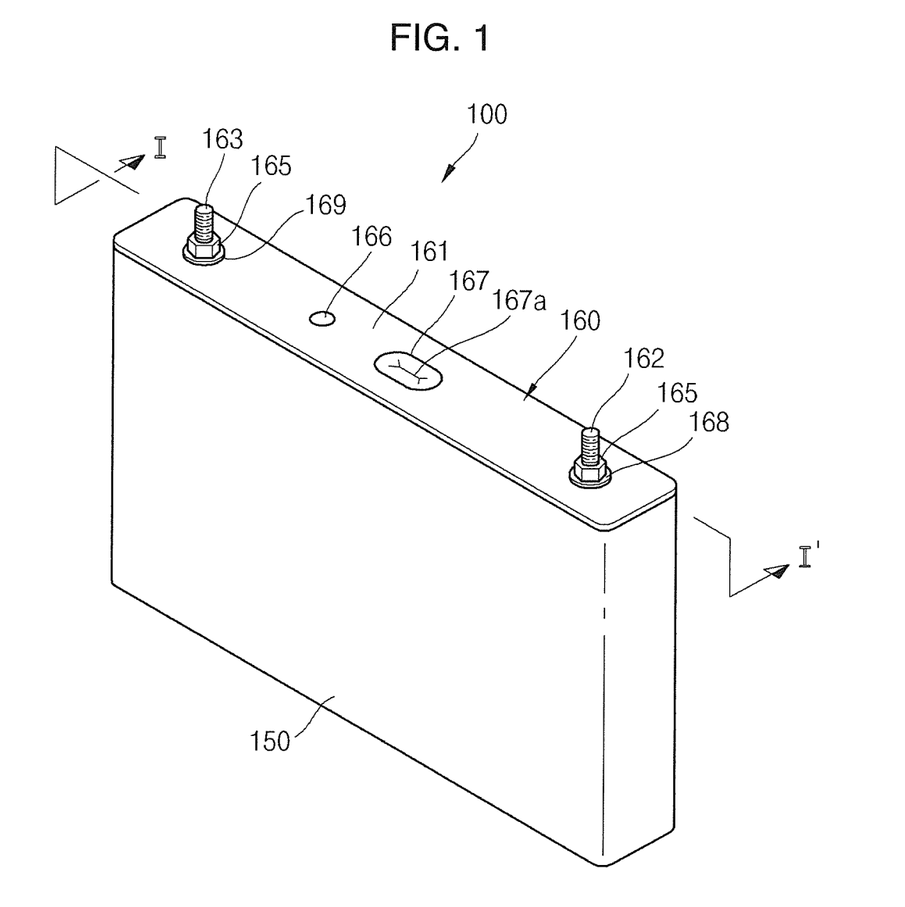
FIG. 1 is a perspective view of a secondary battery according to an embodiment of the present invention.
Figure 2:
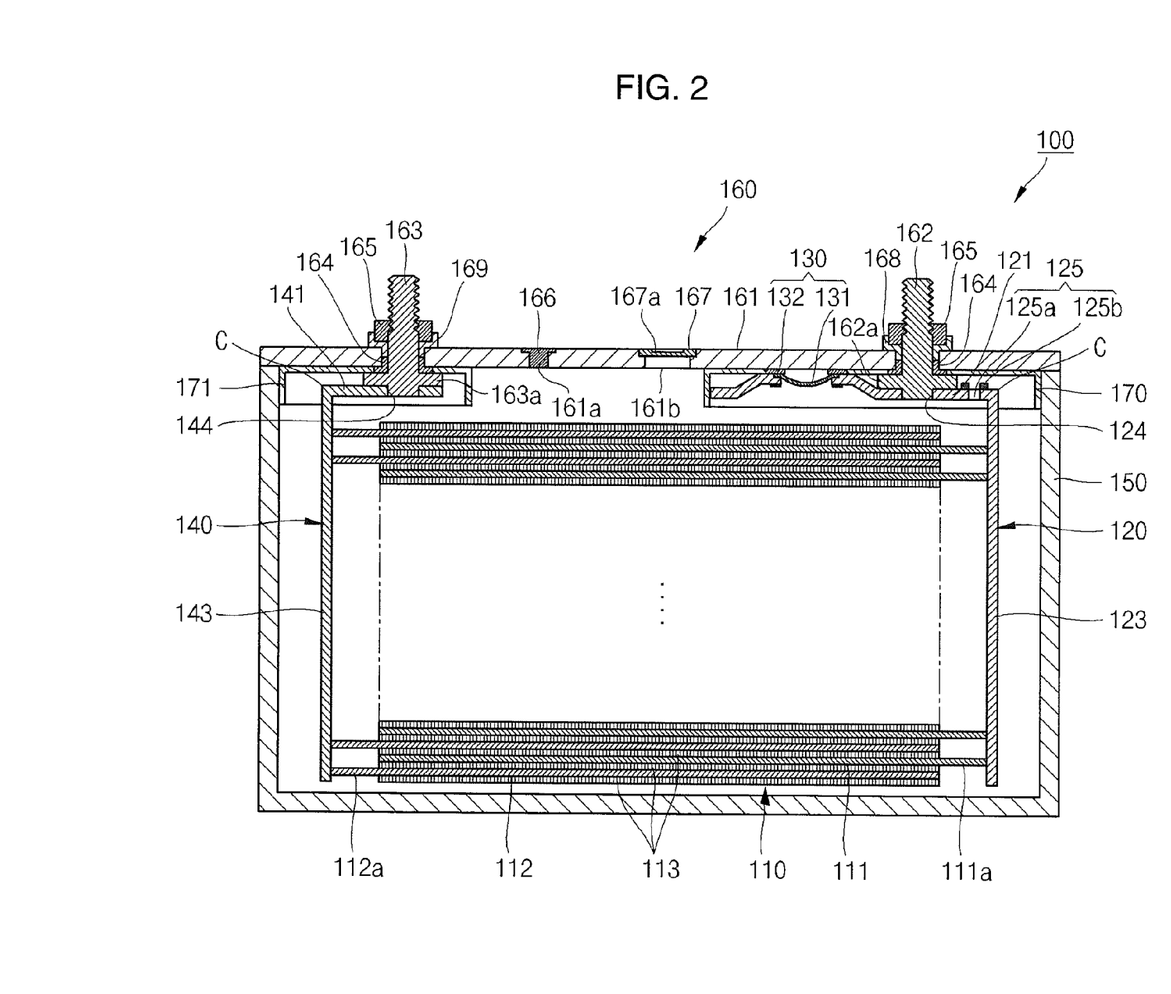
FIG. 2 is a cross-sectional view of the secondary battery of FIG. 1 taken along the line I-I'.
Figure 3:
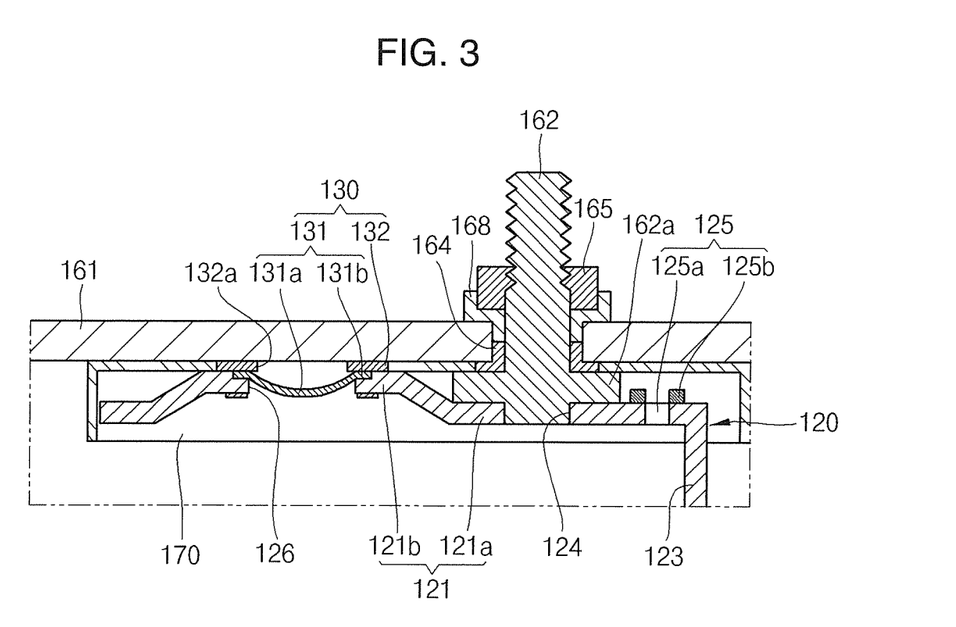
FIG. 3 is an enlarged cross-sectional view illustrating a short circuit member shown in FIG. 2.
Figure 4:
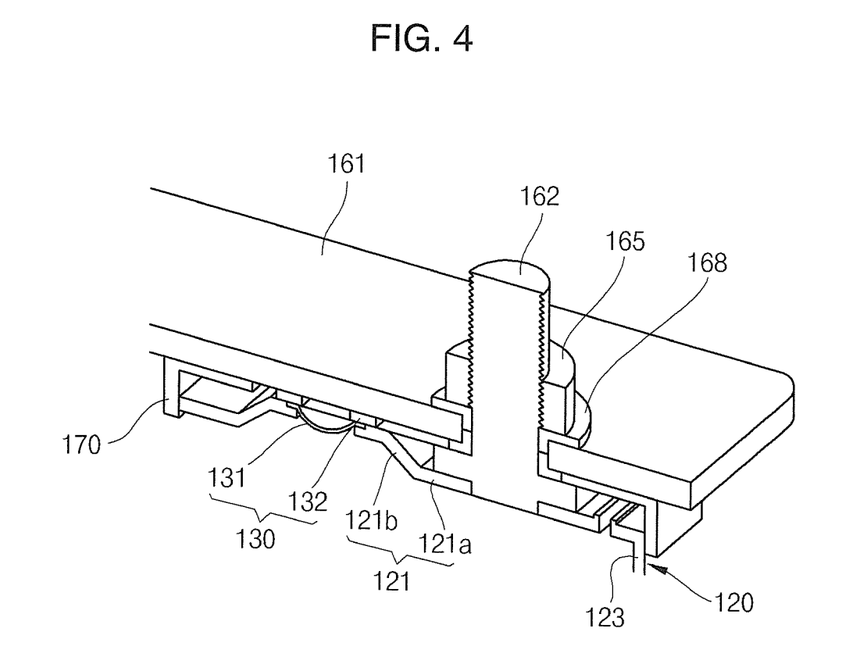
FIG. 4 is a perspective cross-sectional view illustrating the short circuit member shown in FIG. 2.
Figure 5:
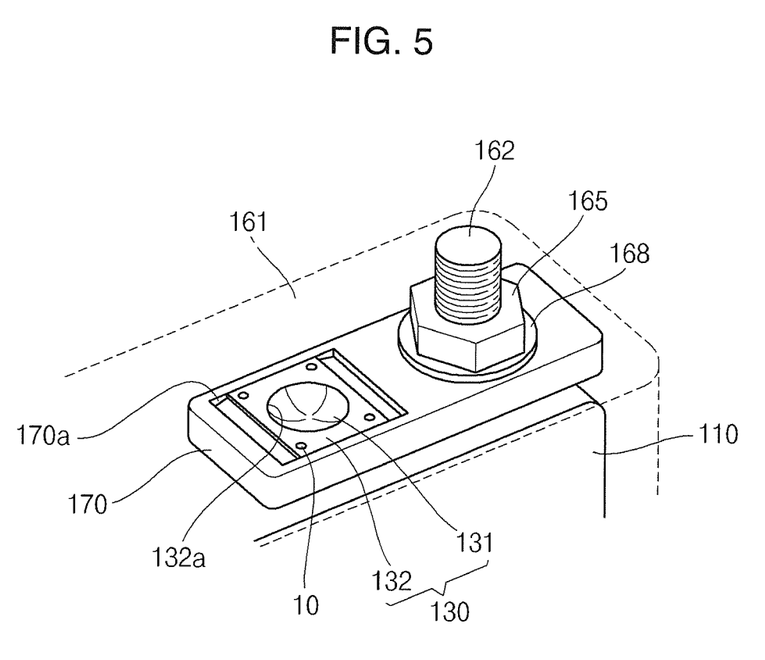
FIG. 5 is a perspective view illustrating the short circuit member shown in FIG. 2.

FIG. 1 is a perspective view of a secondary battery 100 according to an embodiment of the present invention, FIG. 2 is a cross-sectional view of the secondary battery of FIG. 1 taken along the line I-I', FIG. 3 is an enlarged cross-sectional view illustrating a short circuit member 130 shown in FIG. 2, FIG. 4 is a perspective cross-sectional view illustrating the short circuit member 130 shown in FIG. 2, and FIG. 5 is a perspective view illustrating the short circuit member 130 shown in FIG. 2.

Referring to FIGS. 1 through 5, the secondary battery 100 includes an electrode assembly 110, a first collecting plate 120, the short circuit member 130, a second collecting plate 140, a case 150, and a cap assembly 160. The electrode assembly 110 is formed by winding or stacking a first electrode plate 111, a separator 113, and a second electrode plate 112, which are formed of a thin plate or layer. Here, the first electrode plate 111 may operate as a negative electrode and the second electrode plate 112 may operate as a positive electrode, or vice versa. The first and second electrode plates 111 and 112 have different polarities.

The first electrode plate 111 may be formed by coating a first electrode active material such as graphite or carbon on a first electrode collector formed of a metal foil made of copper or nickel. The first electrode plate 111 includes a first electrode uncoated region 111a formed at a first end of the electrode assembly 110. The first electrode uncoated region 111a is a region not coated with the first electrode active material. The first electrode uncoated region 111a becomes a path of the flow of current between the first electrode plate 111 and the outside thereof. In other embodiments, the material of the first electrode plate 111 is not limited to those listed herein.

The second electrode plate 112 may be formed by coating a second electrode active material such as a transition metal oxide on a second electrode collector formed of a metal foil made of aluminum. The second electrode plate 112 includes a second electrode uncoated region 112a formed at a second end of the electrode assembly 110. The second electrode uncoated region 112a is a region not coated with the second electrode active material. The second electrode uncoated region 112a becomes a path of the flow of current between the second electrode plate 112 and the outside thereof. In other embodiments, the material of the second electrode plate 112 is not limited to those listed herein.

The separator 113 is interposed between the first electrode plate 111 and the second electrode plate 112 for preventing a short circuit therebetween and for allowing movement of lithium ions therebetween. In addition, the separator 113 may be formed of polyethylene (PE), polypropylene (PP), or a composite film of PE and PP. In other embodiments, the material of the separator 113 is not limited thereto.

The electrode assembly 110 is accommodated in the case 150 with electrolyte. The electrolyte may include an organic solvent such as ethylene carbonate (EC), propylene carbonate (PC), diethyl carbonate (DEC), ethyl methyl carbonate (EMC), or dimethyl carbonate (DMC), and a lithium salt such as $LiPF_6$ or $LiBF_4$. In addition, the electrolyte can be a liquid, solid, and/or gel electrolyte.

The first collecting plate 120 and the second collecting plate 140 are electrically connected to the first electrode plate 111 and the second electrode plate 112 at the first and second ends of the electrode assembly 110, respectively. The first collecting plate 120 may be made of a conductive material such as copper or a copper alloy. The first collecting plate 120 contacts the first electrode uncoated region 111a protruding to the first end of the electrode assembly 110 to electrically connect to the first electrode plate 111. Referring to FIGS. 2-4, the first collecting plate 120 includes a first connecting portion 121, a first extending portion 123, a first terminal hole 124, a first fuse portion 125, and a first short circuit hole 126.

The first connecting portion 121 is installed between an upper portion of the electrode assembly 110 and a lower portion of the cap assembly 160 and is formed in the shape of a plate. In more detail, the first connecting portion 121 includes an electrode terminal fastening portion 121a and a short circuit member fastening portion 121b. The electrode terminal fastening portion 121a is substantially planar and provides for a space for coupling of a first electrode terminal 162. The short circuit member fastening portion 121b extends from the electrode terminal fastening portion 121a and has a bent portion to closely contact a sealing plate 132 of the short circuit member 130. The short circuit member fastening portion 121b provides for a space for installing a short circuit plate 131 of the short circuit member 130.

The first extending portion 123 extends perpendicularly (or substantially perpendicularly) from an end of the first connecting portion 121. The first extending portion 123 is plate-shaped and makes substantial contact with the first electrode uncoated region 111a. Here, corners where connecting portions and extending portions of collecting plates meet (for example, where the first connecting portion 121 and the first extending portion 123 meet) are denoted as 'C'. The first connecting portion 121 and the first extending portion 123 are perpendicular to each other with respect to the (right hand) corner C, as illustrated in FIG. 2.

The first terminal hole 124 is formed in the electrode terminal fastening portion 121a of the first connecting portion 121 and provides for a space in which the first electrode terminal 162 of the cap assembly 160 is inserted. Here, the first terminal hole 124 is spaced apart from the corner C of the electrode terminal fastening portion 121a.

The first fuse portion 125 is formed on an upper portion of the electrode assembly 110, that is, on the electrode terminal fastening portion 121a of the first connecting portion 121, so as not to contact the electrolyte. In addition, the first fuse portion 125 is positioned at a region adjacent to the corner C of the electrode terminal fastening portion 121a of the first connecting portion 121 so as not to overlap with the first electrode terminal 162 coupled to the first terminal hole 124. In other words, the first fuse portion 125 is positioned at a region of the first connecting portion 121 adjacent to the first extending portion 123 (that is, between the first short circuit hole 126 and the first extending portion 123).

In further detail, the first fuse portion 125 includes a first fuse hole 125a and a first reinforcing protrusion 125b protruding around the first fuse hole 125a. The first fuse hole 125a functions as a fuse that shuts down the flow of current by melting a portion of the first fuse portion 125 where the first fuse hole 125a is formed by the heat generated when a large amount of current flows in the secondary battery 100 due to short circuits. The first reinforcing protrusion 125b reinforces the strength of the portion where the first fuse hole 125a is formed against external impacts before short circuits occur to the secondary battery 100.

The first short circuit hole 126 is formed such that the short circuit plate 131 of the short circuit member 130 extends over the short circuit member fastening portion 121b of the first connecting portion 121. The short circuit member 130 is formed under the cap assembly 160 and allows the first fuse portion 125 to shut down the flow of current by inducing a short circuit when the internal pressure of the secondary battery 100 exceeds a reference pressure level (for example, a predetermined pressure level) due to overcharging the battery 100. To this end, the short circuit member 130 includes a short circuit plate 131 made of a conductive material and a sealing plate 132 made of an insulating material.

The short circuit plate 131 is installed in the first short circuit hole 126, and is spaced apart from and faces a cap plate 161 of the cap assembly 160. The first short circuit plate 131 is an invertible plate (for example, bowl-shaped) having a downwardly convex round portion 131a and an edge portion 131b (for example, a peripheral portion, or a lip). The edge portion 131b extends from an edge of the round portion 131a and is fixed to the short circuit member fastening portion 121b at a location corresponding to (for example, adjacent to) a lateral surface of the first short circuit hole 126. The first short circuit plate 131 is electrically connected to the first collecting plate 120. When the internal pressure of the secondary battery 100 exceeds, for example, the predetermined pressure level, the short circuit plate 131 is configured to invert, that is, to protrude in an upwardly convex manner, thus contacting the cap plate 161 and causing a short circuit to the secondary battery 100.

If such a short circuit is induced, a large amount of current flows and heat is generated in the secondary battery 100. In this case, the first fuse portion 125 functions as a fuse (as described above), thereby improving the safety of the secondary battery 100. Here, the short circuit plate 131 may be made of the same material as the first collecting plate 120, for example, a conductive material such as copper or a copper alloy, to easily weld to the first collecting plate 120. In other embodiments, the short circuit plate 131 is not limited thereto. In addition, in order to allow the first short circuit plate 131 to invert, a thickness of the first short circuit plate 131 may be in a range of approximately 0.4 mm to approximately 0.6 mm. In other embodiments, the thickness of the first short circuit plate 131 is not limited thereto.

The sealing plate 132 is interposed between the cap plate 161 and the short circuit member fastening portion 121b to correspond to (for example, to surround or to cover) a periphery of the first short circuit hole 126. The sealing plate 132 includes an opening 132a formed at a location corresponding to the short circuit plate 131. When the internal pressure of the secondary battery 100 exceeds, for example, the predetermined pressure level, the opening 132a provides for a path that allows the short circuit plate 131 to contact the cap plate 161 to induce the short circuit.

The sealing plate 132 helps prevent a short circuit between the short circuit plate 131 and the cap plate 161. In addition, the sealing plate 132 seals a gap between the cap plate 161 and the short circuit plate 131, and allows the short circuit plate 131 to invert due to a pressure difference between upper and lower portions of the short circuit plate 131 when the internal pressure of the secondary battery 100 exceeds, for example, the predetermined pressure level. Here, the sealing plate 132 may be fixed to the short circuit member fastening portion 121b by means of a coupling member 10 such as a bolt.

The second collecting plate 140 may be made of a conductive material such as aluminum or an aluminum alloy. The second collecting plate 140 contacts the second electrode uncoated region 112a protruding to the second end of the electrode assembly 110 to electrically connect to the second electrode plate 112. The second collecting plate 140 includes a second connecting portion 141, a second extending portion 143 and a second terminal hole 144. The second connecting portion 141 is installed between an upper portion of the electrode assembly 110 and a lower portion of the cap assembly 160 and is formed in the shape of a plate.

The second extending portion 143 is bent with respect to the second connecting portion 141, that is, the second extending portion 143 extends perpendicularly (or substantially perpendicularly) from an end of the second connecting portion 141 and is plate-shaped. The second extending portion 143 makes substantial contact with the second electrode uncoated region 112a. Here, a corner where the second connecting portion 141 and the second extending portion 143 meet is also denoted as 'C'. The second connecting portion 141 and the second extending portion 143 are perpendicular to each other with respect to the (left hand) corner C, as shown in FIG. 2.

The second terminal hole 144 is formed at one side of the second connecting portion 141 and provides for a space in which a second electrode terminal 163 of the cap assembly 160 is inserted and coupled. Here, the second terminal hole 144 is spaced apart from the corner C of the second connecting portion 141.

The case 150 may be made of a conductive metal such as aluminum, an aluminum alloy, or nickel-plated steel. The case 150 is formed in a rectangular box shape and has an opening substantially corresponding to a peripheral portion of the cap assembly 160. The electrode assembly 110, the first collecting plate 120, and the second collecting plate 140 can be inserted through the opening and placed inside the case 150. Meanwhile, the interior surface of the case 150 may be insulated, so that the case 150 is electrically insulated from the electrode assembly 110, the first collecting plate 120, and the second collecting plate 140. Here, the case 150 may serve as an electrode, for example, a positive electrode.

The cap assembly 160 is coupled to the case 150. In more detail, the cap assembly 160 includes the cap plate 161, the first electrode terminal 162, and the second electrode terminal 163. Further, the cap assembly 160 includes a gasket 164 and a nut 165 for each of the first electrode terminal 162 and the second electrode terminal 163. In addition, as illustrated in FIGS. 1-5, the cap assembly 160 may further include a plug 166, a vent plate 167, a first upper insulation member 168, a connection member 169, a first lower insulation member 170, and a second lower insulation member 171.

The cap plate 161 seals an opening of the case 150 and may be made of a conductive material. Here, the cap plate 161 and the case 150 may be made of the same material. In addition, as shown in FIG. 2, the cap plate 161 may include an electrolyte injection hole 161a and a vent hole 161b. Here, the cap plate 161 and the case 150 may have the same polarity.

The first electrode terminal 162 passes through one side of the cap plate 161 to electrically connect to the first collecting plate 120. The first electrode terminal 162 may be pillar-shaped. A thread is formed at an outer circumference of an upper pillar portion of the first electrode terminal 162 exposed at the upper portion of the cap plate 161. A first flange 162a is formed at a lower pillar portion of the first electrode terminal 162 located at the lower portion of the cap plate 161 to prevent the first electrode terminal 162 from being dislodged from the cap plate 161. A partial pillar portion of the first electrode terminal 162 positioned at a lower portion of the first flange 162a of the first electrode terminal 162 is inserted into the first terminal hole 124 of the first collecting plate 120. Here, the first electrode terminal 162 is insulated from the cap plate 161.

The second electrode terminal 163 passes through the other side of the cap plate 161 to electrically connect to the second collecting plate 140. The second electrode terminal 163 includes a second flange 163a, and has a similar configuration as the first electrode terminal 162. Thus, a description of the similar parts will not be repeated. Here, the second electrode terminal 163 is electrically connected to the cap plate 161.

The gasket 164 is formed between the first electrode terminal 162 and the cap plate 161 and between the second electrode terminal 163 and the cap plate 161 using an insulating material to seal spaces therebetween. The gasket 164 helps prevent external moisture from permeating into the secondary battery 100 and helps prevent the electrolyte accommodated in the secondary battery 100 from being effused outside.

The nut 165 is engaged with a thread formed in each of the first electrode terminal 162 and the second electrode terminal 163, thereby fixing the first electrode terminal 162 and the second electrode terminal 163 to the cap plate 161. The plug 166 seals the electrolyte injection hole 161a of the cap plate 161. The vent plate 167 is installed in the vent hole 161b of the cap plate 161 and includes a notch 167a formed to open at a reference pressure (for example, a predetermined pressure).

The first upper insulation member 168 is positioned between the first electrode terminal 162 and the cap plate 161. The first electrode terminal 162 is fitted into the first upper insulation member 168. The first upper insulation member 168 closely contacts the cap plate 161 and the gasket 164. The first upper insulation member 168 insulates the first electrode terminal 162 from the cap plate 161.

The connection member 169 is positioned between the second electrode terminal 163 and the cap plate 161. The second electrode terminal 163 is fitted into the connection member 169. In addition, the connection member 169 closely contacts the cap plate 161 and the gasket 164 through the nut 165. The connection member 169 electrically connects the second electrode terminal 163 and the cap plate 161 to each other.

The first lower insulation member 170 is positioned between the first collecting plate 120 and the cap plate 161 and covers the first connecting portion 121 of the first collecting plate 120. The first lower insulation member 170 is made of an insulating material to prevent an unnecessary short circuit between the first collecting plate 120 and the cap plate 161. The first lower insulation member 170 has a top surface contacting a bottom surface of the cap plate 161 and lateral surfaces extending from edges of the top surface toward the electrode assembly 110.

In further detail, the first lower insulation member 170 includes an exposing hole 170a formed at a location corresponding to the short circuit plate 131 to allow the short circuit plate 131 to contact the cap plate 161 when the short circuit plate 131 is inverted. The exposing hole 170a is larger than the sealing plate 132, so that top surfaces of the sealing plate 132 and the first lower insulation member 170 may be coplanar. In this case, the entire top surface of the first lower insulation member 170 closely contacts with the cap plate 161, thereby allowing the first lower insulation member 170 to fix to the cap plate 161 in a stable manner.

The second lower insulation member 171 is positioned between the second collecting plate 140 and the cap plate 161. The second lower insulation member 171 covers the second connecting portion 141 of the second collecting plate 140. The second lower insulation member 171 may be made of an insulating material.

As described above, since the short circuit member 130 is provided in the secondary battery 100, the number of components required to operate the battery 100 can be reduced, when compared to the conventional secondary battery in which a short circuit member is installed outside a cap assembly. Accordingly, the secondary battery 100 illustrated in FIGS. 1-5 can reduce the manufacturing cost and the number of manufacturing process steps while reducing the overall weight and volume of the battery.

In addition, the secondary battery 100 can help prevent a short circuit from occurring due to external moisture coming into contact with a short circuit member 130, unlike the conventional secondary battery in which a short circuit member is exposed outside of a cap assembly. Further, the secondary battery 100 can efficiently utilize an internal space of the battery by installing the short circuit member 130 within the secondary battery 100, compared to the conventional secondary battery with an external short circuit member.

Additionally, the secondary battery 100 can improve assembling efficiency of the cap assembly 160, compared to the conventional secondary battery. Further, the secondary battery 100 can induce a short circuit according to pressure buildup (for example, during overcharging) using the short circuit member 130.

Next, a secondary battery according to another embodiment of the present invention will be described with reference to FIGS. 6-9.

Figure 6:
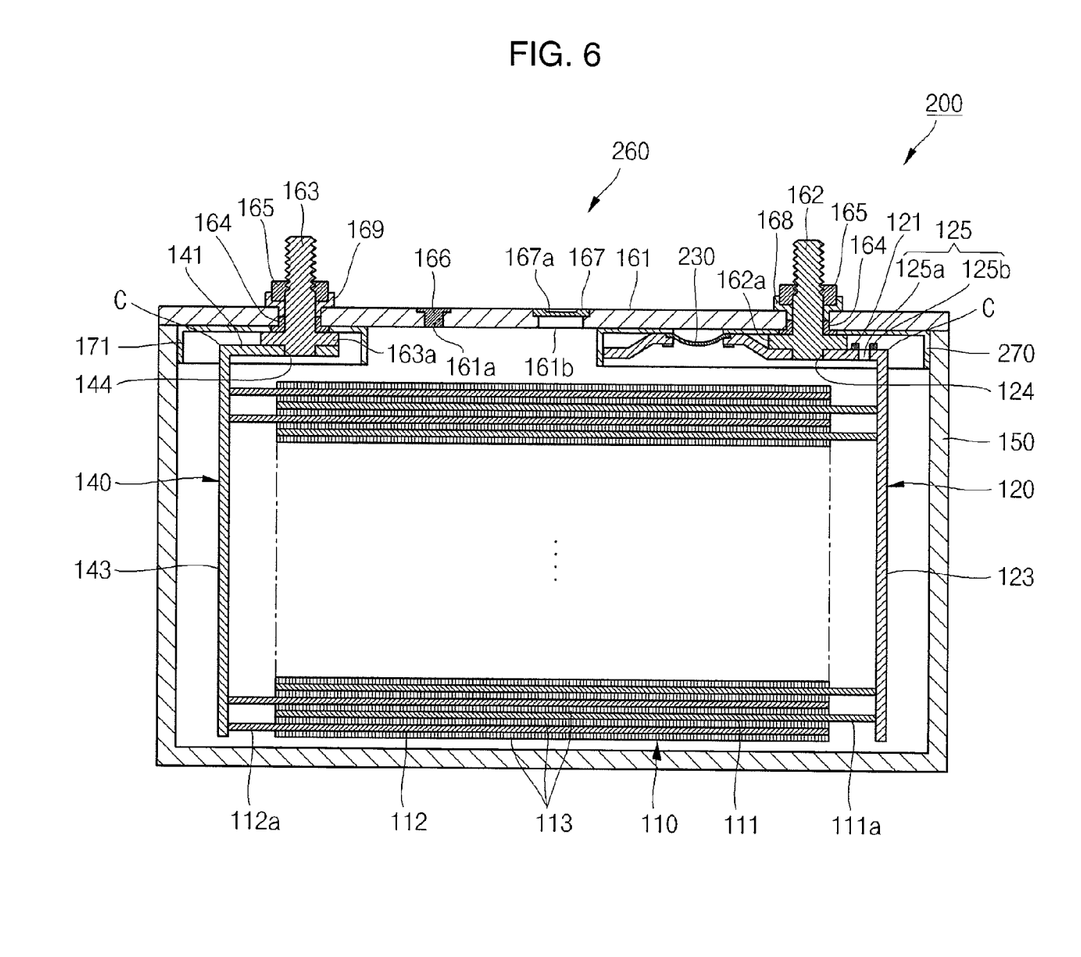
FIG. 6 is a cross-sectional view illustrating a portion corresponding to FIG. 2 in a secondary battery according to another embodiment of the present invention.
Figure 7:
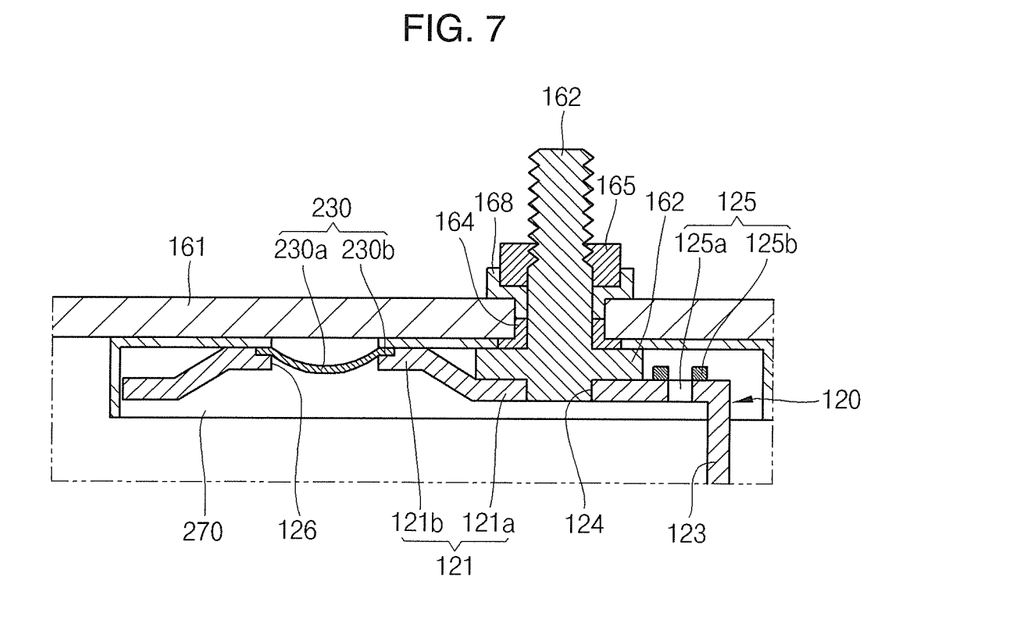
FIG. 7 is an enlarged cross-sectional view illustrating a short circuit member shown in FIG. 6.
Figure 8:
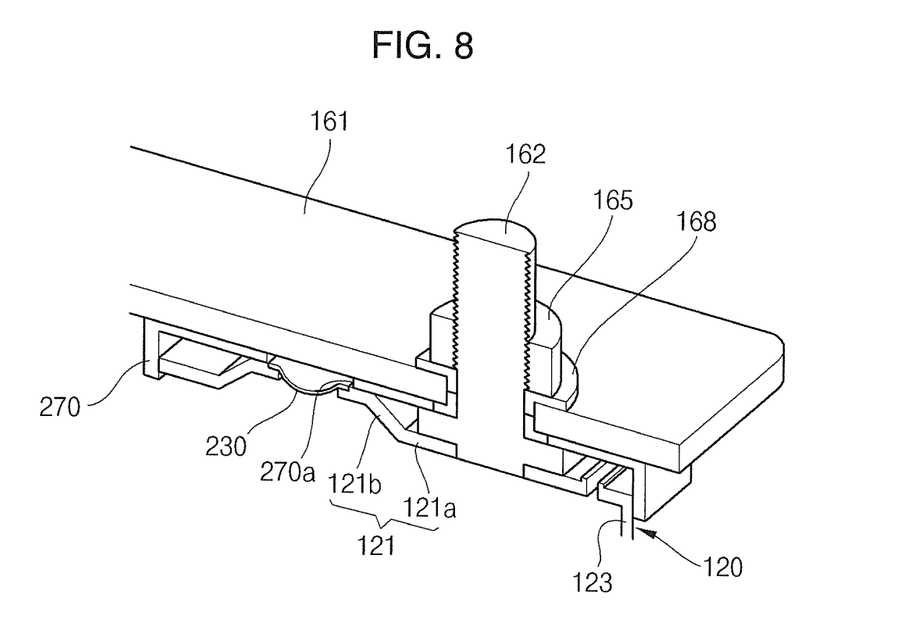
FIG. 8 is a perspective cross-sectional view illustrating the short circuit member shown in FIG. 6.
Figure 9:
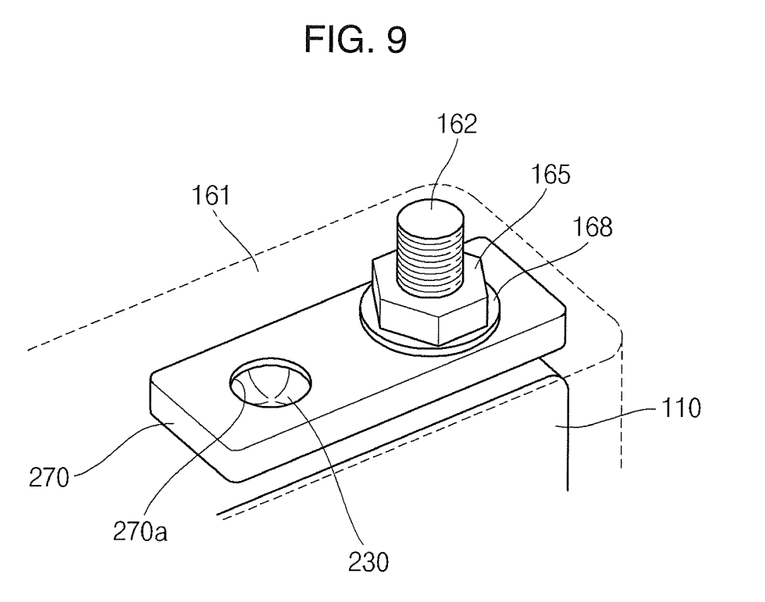
FIG. 9 is a perspective view illustrating the short circuit member shown in FIG. 6.

FIG. 6 is a cross-sectional view illustrating a portion corresponding to FIG. 2 in a secondary battery 200 according to another embodiment of the present invention, FIG. 7 is an enlarged cross-sectional view illustrating a short circuit member 230 shown in FIG. 6, FIG. 8 is a perspective cross-sectional view illustrating the short circuit member 230 shown in FIG. 6, and FIG. 9 is a perspective view illustrating the short circuit member 230 shown in FIG. 6.

The secondary battery 200 is similar to the secondary battery 100 shown in FIG. 2. Significant differences include the short circuit member 230 and a first lower insulation member 270 of a cap assembly 260. Thus, descriptions of the similar parts will not be repeated and the following description will focus primarily on the short circuit member 230 and the first lower insulation member 270.

Referring to FIGS. 6 through 9, the secondary battery 200 includes an electrode assembly 110, a first collecting plate 120, the short circuit member 230, a second collecting plate 140, a case 150, and the cap assembly 260 including the first lower insulation member 270.

Compared to the short circuit member 130 of the embodiment of FIGS. 1-5, the short circuit member 230 is bowl-shaped, having a round portion 230a and an edge portion 230b, and invertible (i.e., capable of being inverted). The short circuit member 230 is located and shaped in a similar manner as the short circuit plate 131, although the sealing plate 132 of the embodiment of FIGS. 1-5 is not provided as part of the short circuit member 230. The short circuit member 230 may be made of a shape memory alloy that reacts to temperature.

In further detail, the short circuit member 230 may be made of a shape memory alloy that reacts at an internal reference temperature (for example, changes shape at a predetermined temperature) of the secondary battery 100, for example, at a temperature in a range of approximately 60° C. to approximately 100° C., which may be indicative that the secondary battery 200 is starting to overcharge. Upon reaching this temperature, the short circuit member 230 is configured to invert, that is, to protrude in an upwardly convex manner, thus contacting a cap plate 161 of the cap assembly 260 and causing a short circuit to the secondary battery 200.

Examples of the shape memory alloy reacting to the temperature in the range of approximately 60° C. to approximately 100° C. may include one or more of Ti—Ni, Ni—Al, In—Ti, and Ti—Ni—Fe, or an alloy thereof. The short circuit member 230 thereby reacts to excessive temperature of the secondary battery 200, for example, when the secondary battery 200 is overcharged or overcharging. Thus, it is not necessary to provide a sealing plate (such as the sealing plate 132 of the short circuit member 130 illustrated in FIGS. 2-5) installed to create a pressure difference between upper and lower portions of the short circuit plate 131 of the short circuit member 130. Accordingly, when compared to the short circuit member 130, the short circuit member 230 can reduce the cost and process step of manufacturing the sealing plate 132.

The first lower insulation member 270 of the cap assembly 260 is similar to the first lower insulation member 170. Here, a size of an exposing hole 270a of the first lower insulation member 270 is approximately equal to that of the short circuit member 230. This is because the sealing plate 132 is removed from the secondary battery 200.

As described above, since the short circuit member 230 is provided in the secondary battery 200, the number of components required to operate the battery 200 can be reduced, when compared to the conventional secondary battery in which a short circuit member is installed outside a cap assembly. Accordingly, the secondary battery 200 can reduce the manufacturing cost and the number of manufacturing process steps while reducing the overall weight and volume of the battery.

In addition, the secondary battery 200 can help prevent a short circuit from occurring due to external moisture coming into contact with a short circuit member 230, unlike the conventional secondary battery in which a short circuit member is exposed outside of a cap assembly. Further, the secondary battery 200 can efficiently utilize an internal space of the battery by installing the short circuit member 230 within the secondary battery 200, compared to the conventional secondary battery with an external short circuit member.

Additionally, the secondary battery 200 can improve assembling efficiency of the cap assembly 260, compared to the conventional secondary battery. Further, the secondary battery 200 can induce a short circuit according to temperature increase (for example, during overcharging) using the short circuit member 230.

According to the embodiment of FIGS. 6-9, the secondary battery 200 includes the short circuit member 230 made of a shape memory alloy reacting to temperature, without the sealing plate 132 of the secondary battery 100. However, according to yet another embodiment of the present invention, a secondary battery including both the sealing plate 132 and the short circuit member 230 may be implemented. In this case, when the secondary battery is, for example, overcharged or overcharging, a short circuit may be induced according to either pressure or temperature, thereby further improving safety of the secondary battery.

While this invention has been described in connection with what is presently considered practical exemplary embodiments, it is understood that the invention is not limited to the disclosed embodiments, but rather is intended to cover various modifications and equivalent arrangements included within the spirit and scope of the appended claims, and equivalents thereof.

What is claimed is:

1. A secondary battery comprising:
an electrode assembly comprising a first electrode having a first polarity and a second electrode having a second polarity different from the first polarity;
a collecting plate electrically connected to the first electrode and having a short circuit hole with an electrically conductive perimeter having the first polarity;
a case accommodating the electrode assembly and the collecting plate and having an opening;
a short circuit member configured to short circuit the secondary battery and comprising a short circuit plate having the first polarity installed in the short circuit hole and including a first side facing a first internal chamber of the case and a second side facing a second internal chamber of the case that is configured to maintain a separate internal pressure from the first internal chamber; and
a cap assembly comprising a cap plate sealing the opening of the case,
wherein the short circuit plate faces the cap plate, and
wherein the short circuit plate and the cap plate are made of a conductive material and configured to have different polarities.

2. The secondary battery of claim 1, wherein the short circuit plate is spaced apart from the cap plate.

3. The secondary battery of claim 1, wherein the short circuit plate is configured to contact the cap plate when an internal pressure of the secondary battery exceeds a reference pressure level.

4. The secondary battery of claim 1, wherein the short circuit plate is configured to contact the cap plate when an internal temperature of the secondary battery exceeds a reference temperature.

5. The secondary battery of claim 1, wherein the short circuit plate is an invertible plate and comprises:
  a downwardly convex round portion; and
  an edge portion
    extending from an edge of the round portion, and
    fixed to a portion of the collecting plate corresponding to a lateral surface of the short circuit hole.

6. The secondary battery of claim 1, wherein
  the short circuit member further comprises a sealing plate between the cap plate and the collecting plate to correspond to a periphery of the short circuit hole, and
  the sealing plate has an opening formed at a location corresponding to the short circuit plate.

7. The secondary battery of claim 6, wherein the sealing plate is made of an insulating material.

8. The secondary battery of claim 6, further comprising a lower insulation member between the collecting plate and the cap plate and covering the collecting plate, wherein the lower insulation member has an exposing hole formed at a location corresponding to the short circuit plate.

9. The secondary battery of claim 8, wherein top surfaces of the lower insulation member and the sealing plate are coplanar.

10. The secondary battery of claim 1, wherein the collecting plate comprises:
  a connecting portion between an upper portion of the electrode assembly and a lower portion of the cap assembly and having the short circuit hole; and
  an extending portion
    extending substantially perpendicularly from an end of the connecting portion, and
    electrically connected to the first electrode.

11. The secondary battery of claim 10, wherein the connecting portion further has a fuse hole formed between the short circuit hole and the extending portion.

* * * * *